United States Patent
White et al.

(10) Patent No.: US 9,590,521 B2
(45) Date of Patent: Mar. 7, 2017

(54) POWER CONVERTERS FOR AIRCRAFT STARTER/GENERATORS

(71) Applicant: Hamilton Sundstrand Corporation, Charlotte, NC (US)

(72) Inventors: Adam M. White, Belvidere, IL (US); Mustansir Kheraluwala, Lake Zurich, IL (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 177 days.

(21) Appl. No.: 14/444,364

(22) Filed: Jul. 28, 2014

(65) Prior Publication Data

US 2016/0028321 A1    Jan. 28, 2016

(51) Int. Cl.
*H02M 5/458*    (2006.01)
*H02M 7/483*    (2007.01)

(52) U.S. Cl.
CPC ......... *H02M 5/458* (2013.01); *H02M 5/4585* (2013.01); *H02M 7/483* (2013.01)

(58) Field of Classification Search
CPC ...... H02M 5/42; H02M 5/458; H02M 5/4585; H02M 7/483; H02M 7/487
See application file for complete search history.

(56) References Cited

U.S. PATENT DOCUMENTS

| | | | | |
|---|---|---|---|---|
| 5,644,483 A * | 7/1997 | Peng | ...................... | H02M 7/487 363/132 |
| 6,459,596 B1 * | 10/2002 | Corzine | .............. | H02M 5/4585 363/127 |
| 7,495,938 B2 * | 2/2009 | Wu | ........................ | H02M 7/487 363/172 |
| 7,573,732 B2 * | 8/2009 | Teichmann | ............. | H02M 1/32 363/37 |
| 8,008,809 B2 * | 8/2011 | Nielsen | ................... | H02J 1/102 307/82 |
| 8,441,820 B2 * | 5/2013 | Shen | ..................... | H02M 7/487 363/131 |
| 9,071,084 B2 * | 6/2015 | Yang | ........................ | H02J 3/36 |
| 9,083,261 B2 * | 7/2015 | Yang | ..................... | H02M 5/458 |

(Continued)

FOREIGN PATENT DOCUMENTS

CN    101860231 A    10/2010
CN    102496957 A    6/2012

OTHER PUBLICATIONS

Extended European Search Report Application No. 15174665.8-1809 dated Dec. 17, 2015.

(Continued)

*Primary Examiner* — Timothy J Dole
*Assistant Examiner* — Yusef Ahmed
(74) *Attorney, Agent, or Firm* — Locke Lord LLP; Scott D. Wofsy; Christopher J. Cillié

(57) ABSTRACT

A method of converting power includes receiving alternating current (AC) at the first phase leg set of a power conversion system having first and second phase legs sets connected by direct current (DC) leads. The first phase leg set rectifies the received AC power into DC power by switching outer switches of the first phase leg set into an off state. The DC lead conveys the DC power from the first phase leg set to the second phase leg set. The second phase leg set inverts the DC power into AC power.

12 Claims, 5 Drawing Sheets

(56) References Cited

U.S. PATENT DOCUMENTS

| | | | | |
|---|---|---|---|---|
| 2005/0111246 | A1* | 5/2005 | Lai | H02M 5/225 363/157 |
| 2006/0126318 | A1* | 6/2006 | Mechi | H02M 5/4585 361/836 |
| 2006/0133120 | A1* | 6/2006 | Sato | H02M 5/4585 363/37 |
| 2006/0197491 | A1* | 9/2006 | Nojima | H02M 7/487 318/801 |
| 2006/0245216 | A1* | 11/2006 | Wu | H02M 7/487 363/13 |
| 2007/0223258 | A1* | 9/2007 | Lai | H02M 5/293 363/37 |
| 2007/0230226 | A1* | 10/2007 | Lai | H02M 5/4585 363/65 |
| 2010/0201197 | A1* | 8/2010 | Shires | H02J 1/10 307/73 |
| 2011/0127837 | A1* | 6/2011 | Sato | H02J 9/062 307/66 |
| 2012/0014151 | A1* | 1/2012 | Alexander | H02M 5/225 363/123 |
| 2013/0063070 | A1* | 3/2013 | Zhang | H02P 27/14 318/729 |
| 2013/0128632 | A1* | 5/2013 | Yang | H02M 7/487 363/37 |
| 2013/0148391 | A1* | 6/2013 | Grbovic | H02M 7/487 363/56.01 |
| 2013/0278229 | A1* | 10/2013 | Chai | H02M 7/487 322/94 |
| 2015/0194902 | A1* | 7/2015 | Tian | H02M 5/458 363/37 |

OTHER PUBLICATIONS

"Three-phase three-level one-cycle controlled bidirectional AC-to-DC NPC converter," Control and Modeling for Power Electronics (COMPEL), 2012 IEEE 13th Workshop on IEEE, Jun. 10, 2012 (Jun. 10, 2012), pp. 1-7, XP032211907, DOI: 10.1109/COMPEL, 2012.6251176 ISBN: 978-1-4244-9372-2 *figures 1-2* *p. 2-p. 3*.

* cited by examiner

POWER CONVERTERS FOR AIRCRAFT STARTER/GENERATORS

BACKGROUND OF THE INVENTION

1. Field of the Invention

The present disclosure relates to power conversion, and more particularly to power converters for gas turbine engine starter/converters.

2. Description of Related Art

Aircraft commonly have main engines and auxiliary power units (APUs) that employ gas turbine engines. Some aircraft include gas turbine engines with generators for converting mechanical work supplied by the engine into electrical power for use by power-consuming devices on board the aircraft. Some aircraft gas turbine engines also include electric starters that convert electrical power provided to the starter into mechanical work for starting the gas turbine engine. The power can be provided from internal or external power sources, such as aircraft generators or batteries.

One challenge to conventional gas turbine engines is packaging engine starters and generators so as to limit the weight and space occupied by the starter and the generator. Some engines include a common motor starter with stator and rotor portions that can operate in both starter and generator mode. In starter mode, electric current applied to windings produces a magnetic field that causes the rotor to rotate and start the engine. In generator mode, mechanical work applied to the rotor induces current in the windings for use by power consuming devices located on the aircraft. Power converters manage power flow within such devices.

Such conventional methods and systems have generally been considered satisfactory for their intended purpose. However, there is still a need in the art for improved power converters. The present disclosure provides a solution for this need.

SUMMARY OF THE INVENTION

A method of converting power includes receiving a first frequency of alternating current (AC) at a first set of phase legs of a power conversion system and receiving a second frequency of alternating current (AC) at a second set of phase legs of a power conversions system. The first and second phase leg sets are connected by direct current (DC) leads. The first or second phase leg set rectifies the received AC power into DC power by switching respective outer switches of the rectifying phase leg set into an off state. The DC link conveys the DC power between the first and second phase leg sets. The other of the first or second phase leg sets receiving the AC current inverts the DC power into AC power.

In certain embodiments the received AC power can be AC power with a variable frequency. The variable frequency AC power can be received by the first phase leg set. Current can bypass the first phase leg outer switches by flowing through anti-parallel diodes arranged electrically in parallel with the outer switches of the first phase leg set.

In accordance with certain embodiments, the received AC power can be AC power with constant frequency. The constant frequency AC power can be received by the second phase leg set. Current can bypass the second phase leg outer switches by flowing through anti-parallel diodes arranged electrically in parallel with the second phase leg set outer switches.

It is also contemplated that in certain embodiments the method can include switching a power conversion circuit between start and generate modes. The method can include configuring the first set of phase legs as a VIENNA rectifier, receiving variable frequency AC power at the first set of phase legs, and outputting constant frequency AC power at the second set of phase legs. The method can also include switching the power conversion circuit from start to generate mode by configuring the second set of phase legs as a VIENNA rectifier. The first phase leg set can be configured as an inverter. Constant frequency AC power can be received at the second set of phase legs and variable frequency AC power can be output from the first set of phase legs. It is also contemplated that the switching between start mode and generate mode can reverse the direction of DC power flow through a DC link connecting the first and second phase leg sets.

A power conversion system includes a first phase leg set connected to a second phase leg set by a DC link. A controller is operatively associated with the first phase leg set and the second phase leg set. The controller has a processor communicative with a memory. The memory has instructions recorded on the memory that, when read by the processor, cause the processor to receive AC power at the first phase leg set, rectify the AC power into DC power, convey the DC power from the first phase leg set to the second phase leg set through the DC link, and invert the DC power into AC power using the second phase leg set.

In certain embodiments the first AC phase leg set can be a variable frequency phase leg set, and the second AC phase leg set can be a constant frequency phase let set. Instructions can cause the processor to configure the system to convert power in a start mode. Configuring the system for start mode can include opening the constant frequency phase leg outer switches such that the system converts received constant frequency AC power into variable frequency AC power by flowing current through diodes arranged in parallel with the constant frequency phase leg outer switches.

In accordance with certain embodiments the first AC phase leg set can be a variable frequency phase leg set, and the second AC phase leg set can be a constant frequency phase leg set. Instructions can cause the processor to configure the system to convert power in a generate mode. Configuring the system for generate mode can include opening variable frequency phase leg set outer switches such that the system converts received variable frequency AC power into constant frequency AC power by flowing current through diodes arranged in antiparallel with the variable frequency phase leg outer switches. It is contemplated that current can flow in opposite directions through the DC link in start mode and generate mode.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, preferred embodiments thereof will be described in detail herein below with reference to certain figures, wherein.

DETAILED DESCRIPTION OF THE PREFERRED EMBODIMENTS

Figure 1:
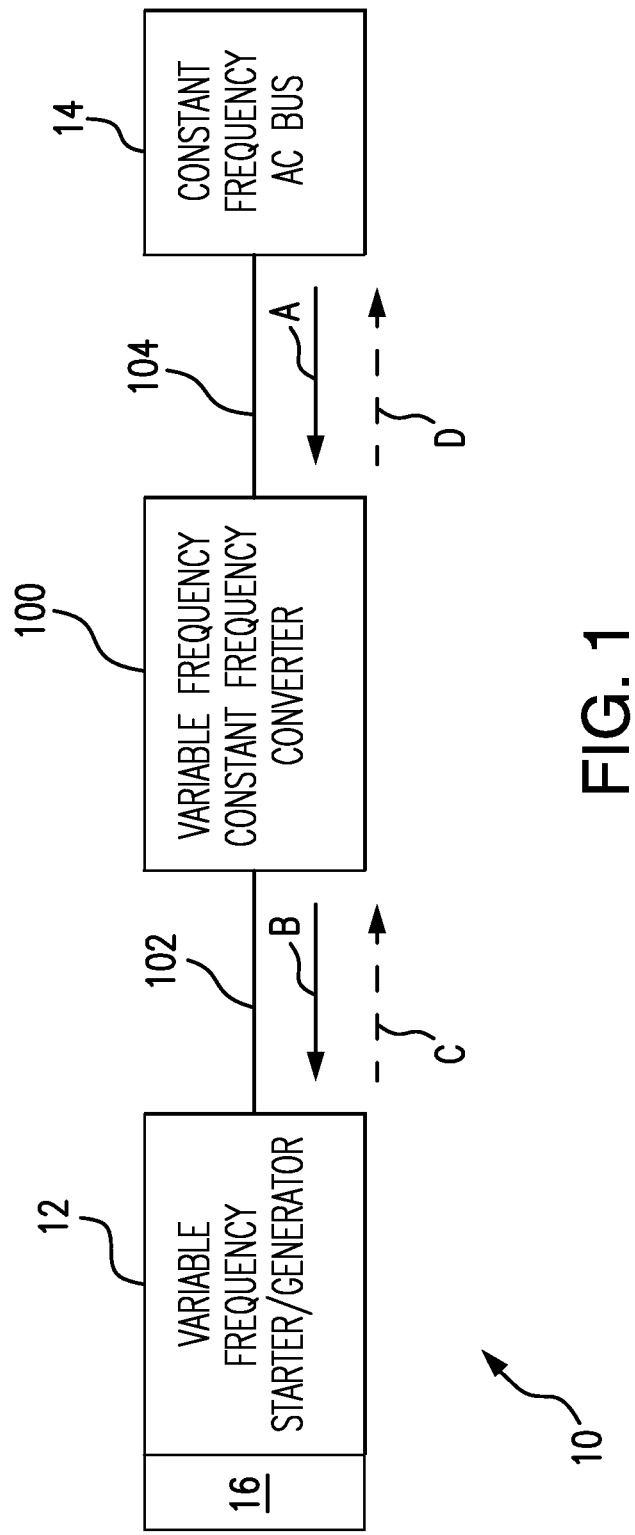
FIG. 1 is a schematic view of an exemplary embodiment of an aircraft power system constructed in accordance with the present disclosure, showing a variable frequency constant frequency (VFCF) converter.

Reference will now be made to the drawings wherein like reference numerals identify similar structural features or aspects of the subject disclosure. For purposes of explanation and illustration, and not limitation, a partial view of an exemplary embodiment of a variable frequency constant frequency (VFCF) converter in accordance with the disclosure is shown in FIG. 1 and is designated generally by reference character 100. Other embodiments of VFCF converters in accordance with the disclosure, or aspects thereof, are provided in FIGS. 2-5, as will be described. The systems and methods described herein can be used for power conversion systems such as aircraft primary power systems.

With reference to FIG. 1, a power system 10 is shown. Power system 10 includes a variable frequency starter/generator 12, a constant frequency alternating current (AC) bus 14, and VFCF converter 100. Variable frequency AC leads 102 electrically connect variable frequency starter/generator 12 to VFCF converter 100. Constant frequency leads 104 electrically connect constant frequency AC bus 14 to VFCF converter 100. Variable frequency starter/generator 12 is configured to both receive variable frequency AC power and rotate a gas turbine engine 16 operatively associated with variable frequency starter/generator 12 and to generate variable frequency AC power using mechanical rotation of gas turbine engine 16. Gas turbine engine 16 can be a main engine or an auxiliary power unit for an aircraft.

VFCF converter 100 is a bidirectional power flow converter configured for AC to AC power conversion in both a start mode and a generate mode. In the start mode, power flows from constant frequency AC bus 14 to variable frequency starter/generator 12 through VFCF converter 100. When in the start mode, constant frequency AC bus 14 provides constant frequency AC power A (illustrated with a solid arrow in FIG. 1) to VFCF converter 100, VFCF converter 100 converts constant frequency AC power flow A into variable frequency AC power B (illustrated with a solid arrow in FIG. 1), and VFCF converter 100 provides variable frequency AC power flow B to variable frequency starter/generator 12. This enables starting gas turbine engine 16 using constant frequency AC power.

In the generate mode power flows in a direction opposite of power flow in the start mode. More specifically, power flows from variable frequency starter/generator 12 to constant frequency AC bus 14 through VFCF converter 100. Variable frequency starter/generator 12 provides variable frequency AC power C (illustrated with a dashed arrow in FIG. 1) to VFCF converter 100. VFCF converter 100 converts the variable frequency AC power into constant frequency AC power, and provides constant frequency AC power to constant frequency AC bus 14 with a constant frequency AC power flow D (illustrated with a dashed arrow in FIG. 1). This enables powering constant frequency AC bus 14 using variable frequency AC power.

Figure 2:
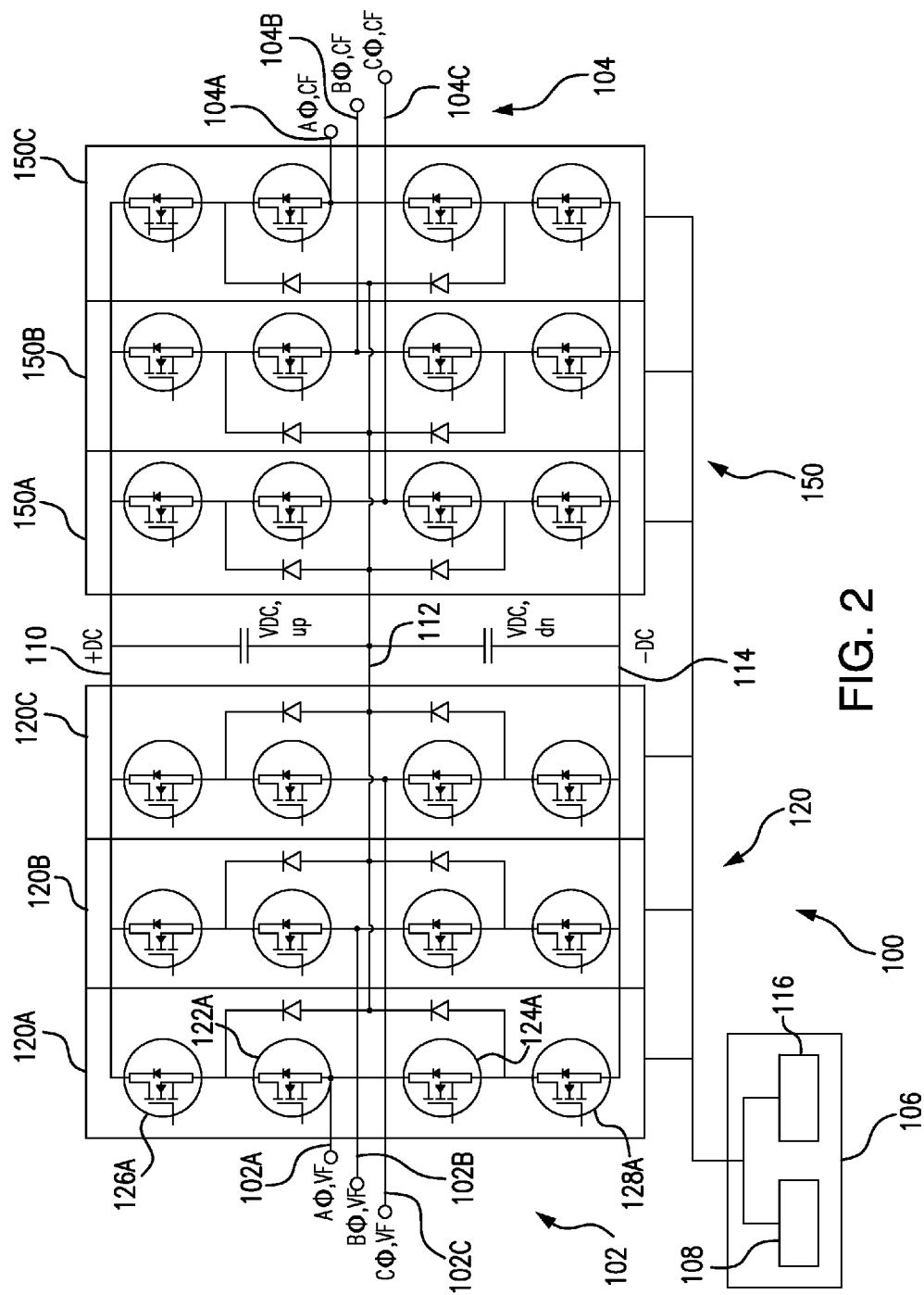
FIG. 2 is a circuit diagram of the VFCF converter of FIG. 1, showing converter circuit topology, according to an embodiment.

With reference to FIG. 2, a circuit diagram of VFCF converter 100 is shown. VFCF includes variable frequency phase legs 120 and constant frequency phase legs 150. As illustrated, VFCF converter 100 is a three-phase converter connected between a first variable frequency AC lead 102A, a second variable frequency AC lead 102B, and a third variable frequency AC lead 102C and a first constant frequency AC lead 104A, a second constant frequency AC lead 104B, and a third constant frequency AC lead 104C, respectively.

Variable frequency phase legs 120 include a first variable frequency phase leg 120A, a second variable frequency phase leg 120B, and a third variable frequency phase leg 120C. First variable frequency phase leg 120A is connected between first variable frequency AC lead 102A and constant frequency AC leads 104. Second variable frequency phase leg 120B is connected between second variable frequency AC lead 102B and constant frequency AC leads 104. Third variable frequency phase leg 120C is connected between third variable frequency AC lead 102C and constant frequency AC leads 104.

Constant frequency phase legs 150 includes a first constant frequency phase leg 150A, a second constant frequency phase leg 150B, and a third constant frequency phase leg 150C. First constant frequency phase leg 150A is connected between first constant frequency AC lead 104A and variable frequency AC leads 102. Second constant frequency phase leg 150B is connected between second constant frequency AC lead 104B and variable frequency AC leads 102. Third constant frequency phase leg 150C is connected between third constant frequency AC lead 104C and variable frequency AC leads 102.

As illustrated, VFCF converter 100 is a three-level converter wherein each phase leg of variable frequency phase legs 120 and constant frequency phase legs 150 are connected to one another through a positive DC link 110, a neutral DC link 112, and a negative DC link 114 in a multilevel arrangement. It is contemplated that VFCF converter 100 can be a two-level inverter or a multilevel inverter with more than three levels, as suitable for an intended application.

With continuing reference to FIG. 2, variable frequency phase legs 120 and constant frequency phase legs 150 include inner and outer switches connected in series with one another. First variable frequency phase leg 120A includes a first inner switch 122A, a second inner switch 124A, a first outer switch 126A, and a second outer switch 128A. First variable frequency AC lead 102A connects between first inner switch 122A and second inner switch 124A. Positive DC link 110 connects to first variable frequency AC lead 102A through serially connected first outer switch 126A and first inner switch 122A. Negative DC link 114 connects to first variable frequency AC lead 102A through serially connected second outer switch 128A and second inner switch 124A. Neutral DC link 112 connects to first variable frequency phase leg 120A through clamping diodes to respective points between the inner and outer switches with diodes configured to oppose power flow as indicated in FIG. 2. First inner switch 122A, second inner switch 124A, first outer switch 126A, and second outer switch 128A include solid-state switch devices, e.g. field effect transistors (MOSFETs) with antiparallel diodes configured to oppose power flow around respective MOSFETs as illustrated in FIG. 2, or insulated gate bipolar transistors (IGBTs), with antiparallel diodes configured to oppose current flow around respective IGBTs. Gates of the MOSFETs are operatively associated with a controller 106 that is configured and adapted to flow current flow through the MOSFET by switching the MOSFETs between on and off states.

Second variable frequency phase leg 120B is similar to first variable frequency phase leg 120A with the difference that second variable frequency AC lead 102B connects to second variable frequency phase leg 120B. Third variable frequency phase leg 120C is similar to first variable frequency phase leg 120A with the difference that third variable frequency AC lead 102C connects to third variable frequency phase leg 120C. First constant frequency phase leg 150A, second constant frequency phase leg 150B, and third constant frequency phase leg 150C are also similar in arrangement to first variable frequency phase leg 120A with the difference that each connects to one of first constant frequency AC lead 104C, second constant frequency AC lead 104B, and third constant frequency AC lead 104A, respectively.

A controller 106 is operatively associated with the inner and outer switches of variable frequency phase legs 120 and constant frequency phase legs 150. Controller 106 has a processor 108 that is configured and adapted for controlling power flow through the phase legs by switching the MOSFETs between on and off states. Controller 106 is communicative with a memory 116 having instructions recorded thereon that, when read by processor 108, cause processor 108 to undertake certain actions. In embodiments, controller 106 provides a pulse width modulated waveform that opens and closes the switches of the phase leg in accordance with the operating mode of VFCF converter 100. For example, in the start mode, the instructions cause VFCF converter 100 to rectify constant frequency AC power into DC power using constant frequency phase legs 150, provide the DC power to variable frequency phase legs 120, and invert the DC power into variable frequency AC power. In the generate mode, the instructions cause VFCF converter 100 to rectify variable frequency AC power into DC power using variable frequency phase legs 120, provide the DC power to constant frequency phase legs 150, and invert the DC power into constant frequency AC power.

Figure 3:
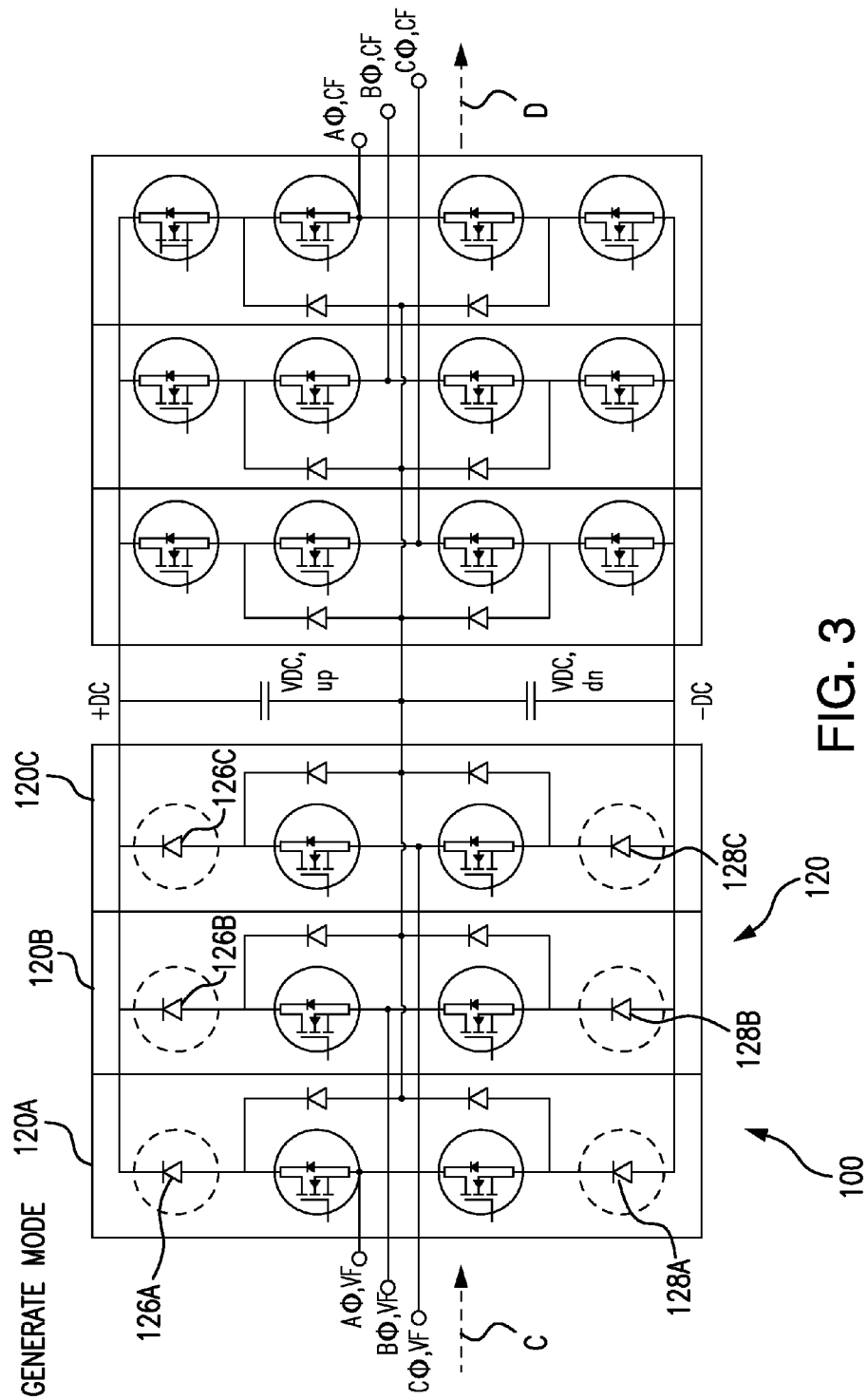
FIG. 3 is a circuit diagram of the VFCF converter of FIG. 1, showing power flow through the converter circuit in a generate mode.

With reference to FIG. 3, a circuit diagram for VFCF converter 100 is shown in the generate mode. In the generate mode, controller 106 (shown in FIG. 2) opens the outer switches of variable frequency phase legs 120, i.e. first outer switch 126A and second outer switch 128A of first variable frequency phase leg 120A, a first outer switch 126B and a second outer switch 128B of second variable frequency phase leg 120B, and a first outer switch 126C and a second outer switch 128C of third variable frequency phase leg 120C. This creates a VIENNA rectifier with variable frequency phase legs 120, causing current to flow to positive DC link 110 and negative DC link 114 through the antiparallel diodes arranged in parallel with the outer switches of variable frequency phase legs 120.

Figure 4:
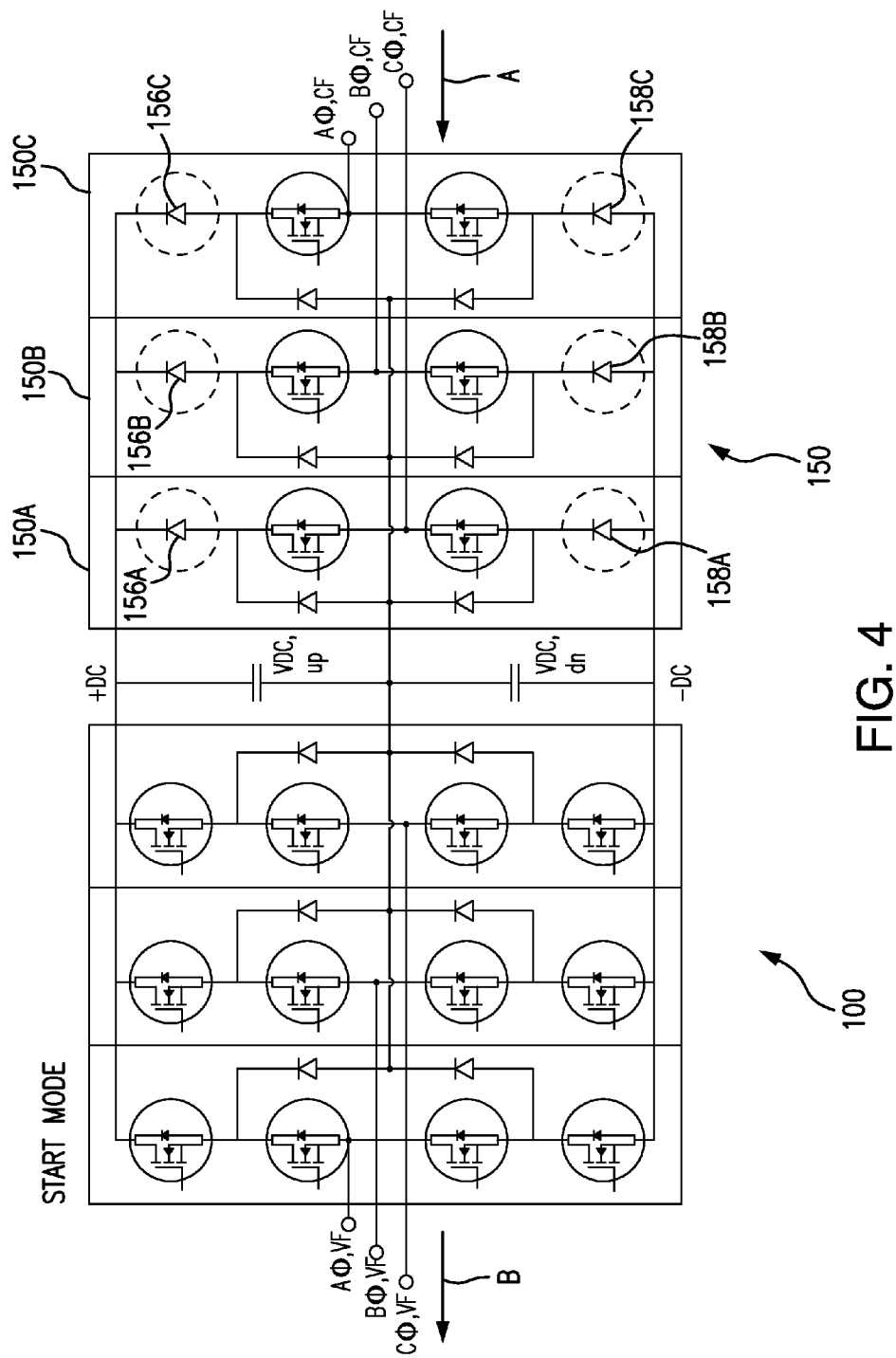
FIG. 4 is a circuit diagram of the VFCF converter of FIG. 1, showing power flow through converter circuit in a start mode.

With reference to FIG. 4, a circuit diagram for VFCF converter 100 is shown in the start mode. When in the start mode, controller 106 (shown in FIG. 2) opens the outer switches of constant frequency phase legs 150, i.e. a first outer switch 156A and a second outer switch 158A of first constant frequency phase leg 150A, a first outer switch 156B and a second outer switch 158B of second constant frequency phase leg 150B, and a first outer switch 156C and a second outer switch 158C of third constant frequency phase leg 150C. This creates a VIENNA rectifier with constant frequency phase legs 150, causing current to flow to positive DC link 110 and negative DC link 114 through the antiparallel diodes arranged in parallel with the outer switches of constant frequency phase legs 150.

Figure 5:
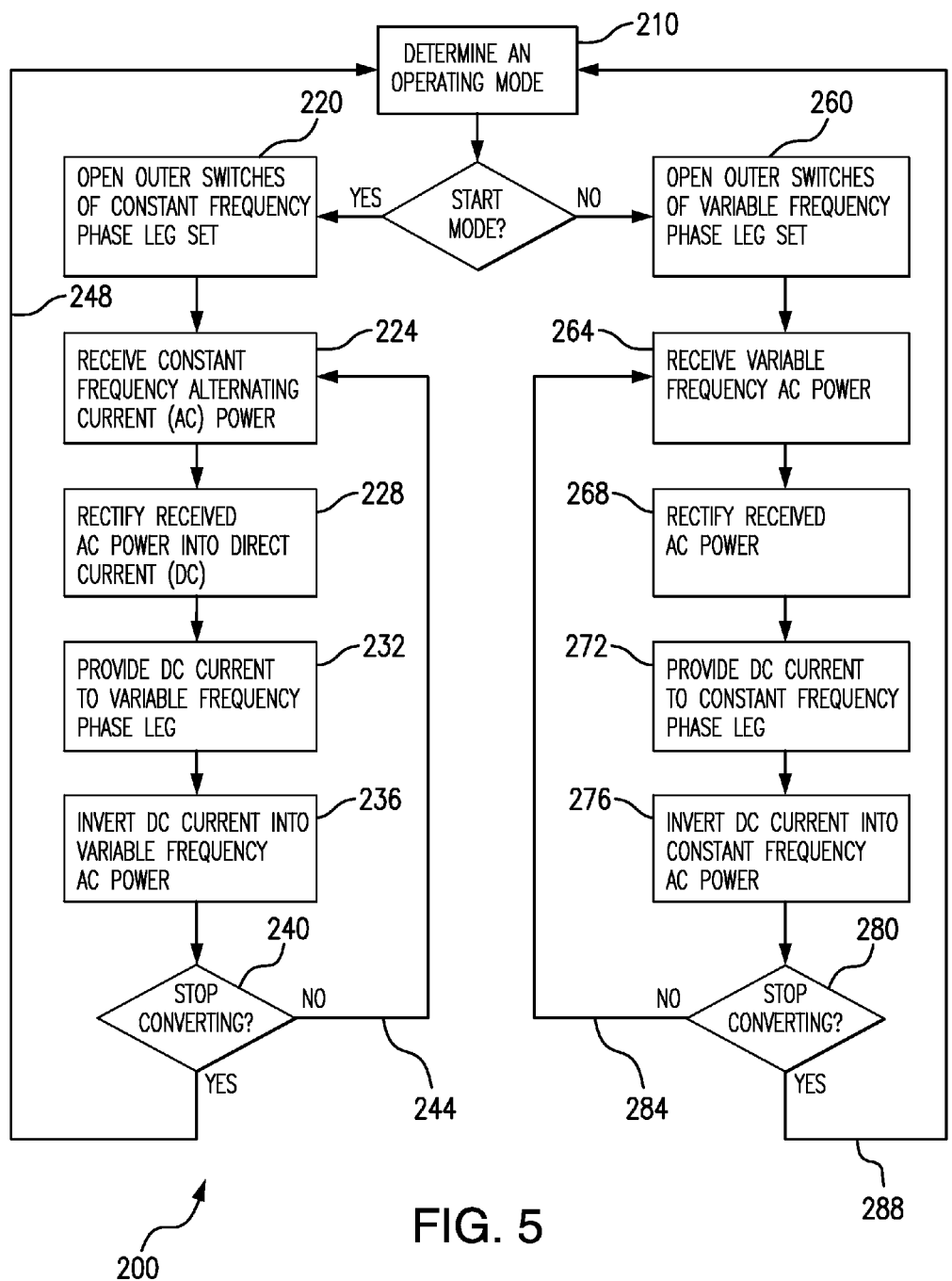
FIG. 5 is a process flow diagram of a method of converting variable frequency alternating current (AC) into constant frequency AC power, and vice versa, showing processes of the method.

With reference to FIG. 5, a method 200 of converting power is shown. Method 200 includes a step 210 for determining an operating mode of a power conversion system, e.g. VFCF converter 100 (shown in FIG. 2). In the event that the determined operating mode is a start mode, method 200 includes a step 220 for opening outer switches of the constant frequency phase legs, e.g. first outer switches 156A, 156B, and 156C and second outer switches 158A, 158B, and 158C of first constant frequency phase leg 150A, second constant frequency phase leg 150B, and third constant frequency phase leg 150C, respectively (shown in FIG. 2).

Method 200 also includes a step 224 for receiving constant frequency AC power at the constant frequency phase legs and a step 228 for rectifying received AC power using the constant frequency phase legs. The rectified AC power is provided as DC power to the variable frequency phase legs, e.g. first variable frequency phase leg 120A, second variable frequency phase leg 120B, and third variable frequency phase leg 120C (shown in FIG. 2), through a DC link, e.g. positive DC link 110 (shown in FIG. 2), in a first direction in a step 232. The DC power is thereafter inverted into variable frequency AC power using the variable frequency phase legs in a step 236. This process continues in a step 244 until it is determined to stop converting constant frequency AC power into variable frequency AC power (such as after a successful start of a gas turbine engine, e.g. gas turbine engine 16 shown in FIG. 1), at which point method 200 returns to step 210 in a step 288.

In the event that the determined operating mode is generate mode, method 200 includes a step 260 for opening outer switches of the variable frequency phase legs, e.g. first outer switches 126A, 126B, and 126C (shown in FIG. 2) and second outer switches 128A, 128B, and 128C (shown in FIG. 2) of the variable frequency phase legs. This bypasses the respective open switches by flowing current through the switch antiparallel diodes arranged in parallel with the open switches of the variable frequency phase legs.

Method 200 also includes a step 264 for receiving variable frequency AC power at the variable frequency phase legs and a step 268 for rectifying received AC power at the variable frequency phase legs. The rectified AC power is provided as DC power to the constant frequency phase legs through the DC link in a second direction in a step 272. The second direction of power flow is opposite the first direction of power flow. The DC power is thereafter inverted into constant frequency AC power by the constant frequency phase legs in a step 276. This process continues in a step 284 until it is determined to stop converting variable frequency AC power into constant frequency AC power, at which point method 200 returns to step 210 via a step 288.

The methods and systems of the present disclosure, as described above and shown in the drawings, provide for power conversion systems with superior properties including compact circuit topologies. While the apparatus and methods of the subject disclosure have been shown and described with reference to preferred embodiments, those skilled in the art will readily appreciate that changes and/or modifications may be made thereto without departing from the spirit and scope of the subject disclosure.

What is claimed is:

1. A method of converting power, comprising:
   determining an operating mode of a gas turbine engine selected, wherein the operating mode is selected from a group including a start mode and a generate mode;
   receiving AC power at a first set of phase legs;
   rectifying the received AC power into DC power using the first set of phase legs;
   receiving the rectified DC power at a second set of phase legs by flowing current through a DC link; and
   inverting the received DC power into AC power using the second set of phase legs,
   wherein at least one of the rectifying and inverting processes further includes switching respective outer switches of the first or second phase leg sets into an off state;
   wherein the received AC power is constant frequency AC power, current flows through the DC in a first direction, the inverted AC power is variable frequency AC power when the operating mode is the start mode; and
   wherein the received AC power is variably frequency AC power, current flows through the DC in a second direction opposite the first direction, and the inverted AC power is constant frequency AC power when the operating mode is the generate mode.

2. The method as recited in claim 1, wherein the outer switches are a plurality of outer switches in the second set of phase legs, and further including converting received constant frequency AC power into variable frequency AC power in a start mode by routing current through diodes in parallel with the outer switches of the second phase leg set.

3. The method as recited in claim 1, wherein the outer switches are a plurality of outer switches arranged within the first phase leg set, and further including converting received variable frequency AC power into constant frequency AC power in a generate mode by routing current through diodes in parallel with the outer switches of the first phase leg set.

4. The method as recited in claim 1, further including:
   switching a power conversion circuit from a start mode to a generate mode by configuring the first phase leg set as a VIENNA rectifier;
   receiving variable frequency AC power at the first phase leg set; and
   outputting constant frequency AC power at the second phase leg set.

5. The method as recited in claim 1, further including switching a power conversion circuit from a start mode to a generate mode by configuring the first phase leg set as a VIENNA rectifier.

6. The method as recited in claim 5, further including:
   reconfiguring the first phase leg set as an inverter;
   receiving constant frequency AC power at the second phase leg set; and
   outputting variable frequency AC power at the first phase leg set.

7. The method as recited in claim 6, further including selecting a direction of current flow through the DC link according to the determined operating mode of the gas turbine engine.

8. A power conversion system, comprising:
   first and second AC phase leg sets connected by a DC link, wherein the phase legs of the first AC phase leg set are variable frequency phase legs, and wherein the second AC phase leg set is a constant frequency phase leg set; and
   a controller operatively associated with first and second AC phase leg sets including a processor and a memory, wherein the processor is communicative with the memory and the memory has instructions recorded therein that, when read by the processor, cause the processor to:
   determine an operating mode of gas turbine engine;
   select a direction of current flow through the DC link according to operating mode of the gas turbine engine by (a) configuring the system to convert power in a start mode by opening a constant frequency phase leg set outer switches, and (b) configuring the system to convert power in a generate mode by opening a variable frequency phase leg set outer switches;
   receive AC power at the first AC phase leg set;
   rectify the AC power into DC power using the first AC phase leg set;
   convey the DC power from the first AC phase leg set to the second AC phase leg set through the DC link; and
   invert the DC power into AC power using the second AC phase leg set.

9. The system as recited in claim 8, wherein the instructions further include cause the processor to:
   convert received constant frequency AC power into variable frequency AC power by flowing current through a diode arranged in parallel with the constant frequency phase leg set outer switches.

10. The system as recited in claim 8, wherein the instructions further include cause the processor to:
    convert received variable frequency AC power into constant frequency AC power by flowing current through diodes arranged in parallel with the variable frequency phase leg set outer switches.

11. The system as recited in claim 8, wherein the instructions further cause the processor to flow current through the DC link in opposite directions in start and generate modes.

12. A power conversion method, comprising:
    determining an operating mode of a gas turbine engine, wherein the operating mode includes a start mode and a generate mode;
    wherein, when the determined operating mode is the start mode, the method includes:
       opening outer switches of a constant frequency phase leg set;
       receiving constant frequency alternating current (AC) power at the constant frequency phase leg set;
       rectifying the received AC power into direct current (DC) power using the constant frequency phase leg set;
       providing the DC power to a variable frequency phase leg set by flowing the DC current through a DC link in a first direction;
       inverting the DC power into variable frequency AC power using a variable frequency phase leg set; and
       determining to stop converting upon start of the gas turbine engine;
    when the operating mode is the generate mode, the method including:
       opening the outer switches of the variable frequency phase leg set;
       receiving variable frequency AC power at the variable frequency phase leg set;
       rectifying the received AC power at the variable frequency phase let set;
       providing the DC power to the constant frequency phase leg set by flowing the DC current through the DC in a second direction; and inverting the DC current into constant frequency AC power using the constant frequency phase leg set.

* * * * *